Patented Dec. 4, 1923.

1,476,182

UNITED STATES PATENT OFFICE.

GWYNNE RICHARDS, OF NEW YORK, N. Y.

FOOD PRODUCT AND PROCESS OF MAKING THE SAME.

No Drawing.    Application filed September 13, 1921.   Serial No. 500,418.

*To all whom it may concern:*

Be it known that I, GWYNNE RICHARDS, a citizen of the United States of America, residing at the borough of Manhattan, city, county and State of New York, have invented certain new and useful Improvements in Food Products and Processes of Making the Same, of which the following is a specification.

My invention relates to that class of foods usually sold in packages and intended to be eaten with milk and sugar as a substitute for the cereals generally eaten at breakfast.

The material I employ is the residue, or mash, left after the soya bean has been treated so as to extract the milk or juice thereof for the purpose of forming from such milk, or juice, curds which have for many centuries been used as an article of food in the Orient. In such old process the beans are soaked in water, ground at a low temperature, cooked with about twice the bulk of water and the juice extracted by treatment in a filter press. The residue, or mash, remaining in the filter press, after the obtainable quantity of juice has been expressed, has heretofore been considered a waste product and thrown away, or fed to stock without further treatment.

I have discovered that if such mash is air dried and toasted at a proper temperature it exists as a finely divided mass which forms a most palatable and nutritious food when eaten with sugar and milk or cream, in the usual way.

In such drying the temperature should not be permitted to rise above certain limits, as an excess of heat gives a characteristic oleaginous flavor to the mass. As at present advised an air temperature of about 212 degrees Fahrenheit is permissible, the temperature of the mass being dried remaining about 40 degrees below that temperature, on account of the cooling effect of the evaporation of its contained moisture. After the drying is completed I allow the mass to remain in the drier for a few minutes to toast it slightly.

To avoid the production of the same oleaginous flavor in the original mash, the grinding of the beans should be done at a low speed and between stones of a character such that no objectionable degree of heat is generated from friction in the grinding operation.

The solids in such dried product are composed of the following constituents in about these proportions: protein, 20 per cent; carbo-hydrates, 57 per cent; fat, 3 per cent; and the balance ash and fibre. The carbo-hydrates break up into a galactose and are practically free from starch. The proportion of protein is higher and that of carbo-hydrates lower, than in cereal breakfast foods, and this, with the total absence of starches, makes my invention a most desirable food for persons who have any tendency to the production of excessive adipose tissue.

Having described my invention, I claim:

1. As an article of manufacture the herein described food product which comprises the dried solid residue of the soya bean after the juice of said bean has been expressed therefrom.

2. As an article of manufacture the herein described food product which comprises the dried and toasted residue of the soya bean after the juice of said bean has been expressed therefrom.

3. As an article of manufacture the herein described food product, free from oleaginous flavor, which comprises the dried solid residue of the soya bean after the juice of said bean has been expressed therefrom.

4. The process of treating soya beans to form a dry food product therefrom, which comprises the following steps: first, soaking said beans in water; second, grinding the soaked mass at a temperature low enough to avoid the generation of an oily flavor therein; third, cooking the mass; fourth, expressing the juices from the ground and cooked mass; and fifth, drying the solid residue at a similar temperature.

GWYNNE RICHARDS.